United States Patent [19]

Mason

[11] Patent Number: 4,557,834
[45] Date of Patent: Dec. 10, 1985

[54] FLUID FILTER WITH AXIAL AND CIRCUMFERENTIAL SEAL

[75] Inventor: Robert Mason, Placentia, Calif.

[73] Assignee: Pall Corporation, Glen Cove, N.Y.

[21] Appl. No.: 494,187

[22] Filed: May 13, 1983

[51] Int. Cl.⁴ .......................................... B01D 27/10
[52] U.S. Cl. .................................. 210/445; 210/450; 210/451; 210/455
[58] Field of Search ................. 210/137, 416.2, 416.4, 210/416.5, 445, 446, 447, 448, 450, 451, 452, 453, DIG. 17, 455; 55/501, 502, 507, 509

[56] References Cited

U.S. PATENT DOCUMENTS

| | | | |
|---|---|---|---|
| 2,707,051 | 4/1955 | Mailhot et al. | 210/137 |
| 3,151,071 | 9/1964 | Kasten | 210/232 |
| 3,193,102 | 7/1965 | Bottoms et al. | 210/137 |
| 3,207,311 | 9/1965 | Kasten | 210/137 |
| 3,240,342 | 3/1966 | Callahan, Jr. et al. | 210/232 |
| 3,847,819 | 11/1974 | Firth | 210/448 |
| 3,993,561 | 11/1976 | Swearingen | 210/131 |
| 4,018,686 | 4/1977 | Shufflebarger et al. | 210/448 |
| 4,108,775 | 8/1978 | Wilkes et al. | 210/453 |
| 4,120,794 | 10/1978 | Taylor | 210/453 |
| 4,361,483 | 11/1982 | Pall | 210/445 |

OTHER PUBLICATIONS

Hackh's Chemical Dictionary, McGraw Hill Book Company, 1969, p. 536.

Primary Examiner—Marc L. Caroff
Assistant Examiner—Wanda L. Millard
Attorney, Agent, or Firm—Leydig, Voit & Mayer, Ltd.

[57] ABSTRACT

A fluid filter having a housing with an inlet and an outlet and a filter cartridge disposed in the housing and comprising a generally tubular filter element confined between endcaps at each end thereof. One end cap is closed and the other end cap has a nipple-like extension with an opening therethrough communicating the interior of the tubular filter with the outlet. The extension is telescopically received by a generally mating socket in the housing and is both axially and circumferentially sealed to the socket, with the circumferential sealing being maintained over a limited range of travel of the filter cartridge relative to the housing. A spring urges the extension toward the axially sealed condition in the socket and a perforated cylinder interposed between the one end cap and the housing precludes the filter cartridge from travelling a distance sufficient to break the circumferential seal between the extension and the socket in the event the flow of fluid through the filter is reversed.

18 Claims, 2 Drawing Figures

FLUID FILTER WITH AXIAL AND CIRCUMFERENTIAL SEAL

BACKGROUND OF THE INVENTION

This invention relates generally to a fluid filter suitable for a broad range of applications and which may be especially advantageously employed in the filtration of corrosive gasses and solvents used by the electronics industry in the manufacture of integrated circuits. It will be apparent, however, that the filter structure of this invention may be used wherever fluid system contamination must be avoided. It is particularly adapted for mounting upstream from solenoid and metering valves where the filter acts efficiently to reduce wear and prevent clogging of orifices and clearances between mating parts so that the protected equipment can function as intended.

The known filter structures of this general type routinely utilize either circumferential or axial sealing for sealing the filter cartridge to the housing. U.S. Pat. No. 3,151,071 to Kasten illustrates a plurality of filter cartridges, each having an extension which is received by an opening in a partition disposed in the interior of the housing. A bead located on the periphery of the extension is subject to circumferential pressure, thereby effecting a seal with the inside diameter of the opening in the partition. While suitable for relatively low pressure applications, if the pressure differential across the filter is greater than the sealing force exerted on the bead, the seal may be broken, thereby permitting unfiltered fluid to bypass the filter element.

Axial sealing is effected in some known filter structures, as illustrated in U.S. Pat. No. 3,240,342 to Callahen, Jr., et al., by utilizing a spring to urge the filter cartridge axially into a sealing engagement with the housing. Generally, however, no other provision is made to prevent the loss of the sealing condition in the event the flow of fluid through the filter is reversed, whereby the force of the reverse flow against the filter cartridge may be greater than the force exerted by the spring. In such an instance, the cartridge may move axially in the housing, breaking the seal and opening a direct communication between the prefiltered and filtered fluid.

Accordingly, it is the principal object of the present invention to provide a fluid filter which is reliable and which will maintain a positive seal in the event the flow of fluid through the filter is reversed.

Other objects and advantages of the invention will become apparent upon reading the attached detailed description and upon reference to the drawings in which:

DETAILED DESCRIPTION

While the invention has been described in connection with a preferred embodiment, it will be understood that I do not intend to be limited to the particular embodiment shown but intend, on the contrary, to cover the various alternative and equivalent constructions which may be included within the spirit and scope of the appended claims.

Figure 1:
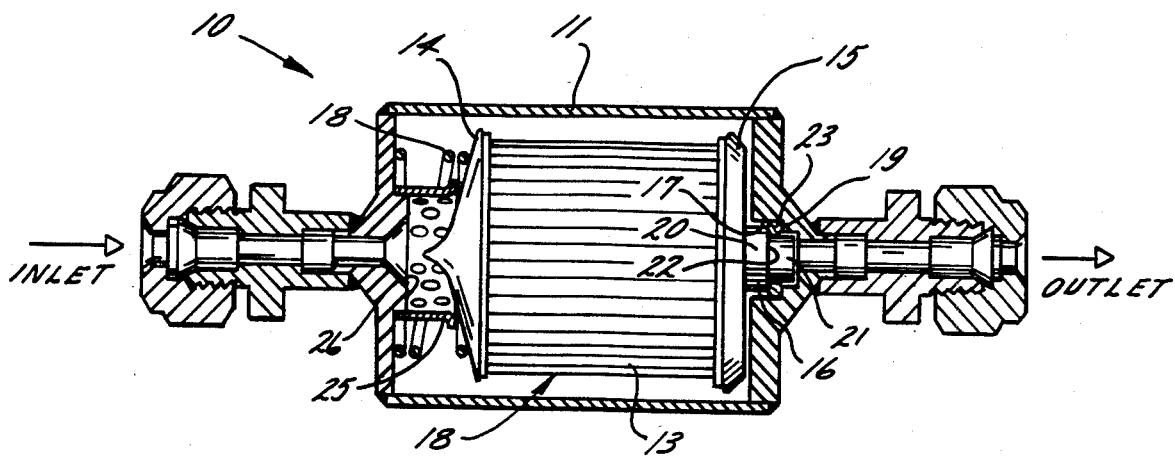
FIG. 1 is a cross sectional side elevation of a fluid filter constructed in accordance with the invention; and, FIG. 2 shows an alternate fluid filter constructed in accordance with the invention.

Turning now to the drawings, there is shown in FIG. 1 a flow-line filter structure, denoted generally as 10, having a housing 11 with an inlet and an outlet. A filter cartridge 12 comprising a tubular filter 13, with endcaps 14, 15 at each end thereof, is shown disposed in the housing. The upstream end cap 14 is closed with the downstream end cap 15 having a nipple-like extension 16 with an opening therethrough communicating the interior of the tubular filter with the outlet. The extension 16 is telescopically received by a generally mating socket 17 recessed in one end of the housing. In accordance with the present invention, a spring 18 abutting the one end cap 14 urges the extension, through a gasket or compressible sealing member such as an O-ring 23, into axial sealing engagement with the shoulder 19 of socket 17, with the diameter of the O-ring 23 relative to the socket 17 being such that it also establishes circumferential sealing between the extension 16 and the mating socket 17. This axial and circumferential "redundancy" in the sealing, in combination with the restraint discussed below, ensures that at least a circumferential sealing condition is maintained even if the axial sealing condition is lost, as it might be with an inadvertent flow reversal through the filter or other circumstance which overcomes the axial force generated by the spring 18.

Turning again to FIG. 1, the extension 16 is of slightly smaller diameter than the inside diameter of the socket 17 and consists of two cylindrical portions 20, 21 arranged in stepped relation. A ridge or flange 22 is defined by the discontinuity between the two portions 20, 21. For the purpose of axially sealing the extension to the socket, the most outwardly disposed portion 21 carries the O-ring 23, which is under axial compression between the shoulder 19 of the mating socket 17 and the flange 22. In keeping with the object of this invention, it is contemplated that the free outer diameter of the O-ring 23 be slightly larger than the diameter of the mating socket 17. The O-ring will be under circumferential pressure between the inner surface of the socket 17 and the outermost portion 21 of the extension 16, thereby forming an effective seal that can withstand relatively high fluid pressures.

In order to withstand the effects of corrosive fluids, the O-ring 23 may be formed of or coated with an inert, non-bleachable material such as Teflon, which has been found to resist the oxidizing effects of gasses such as xylenes, silanes and hydrogen chloride. Similarly, in order to inhibit flutter and the resulting damage to the components of the filter structure, the O-ring 23 may be formed of a sufficiently soft material to dampen the vibration caused by the flow of fluid through the filter cartridge 12. An O-ring formed of such a resilient material will also tend to conform to the space defined by the shoulder 19, the flange 22 and the adjacent surfaces of the extension 16 and the socket 17, thereby effecting a very positive, leak-tight seal.

As noted above, in accordance with a feature of the invention, the axial movement of the filter cartridge relative to the housing is restrained to prevent loss of the circumferential sealing condition between the extension and the socket in the event the flow of fluid through the filter is reversed. For this purpose, as shown in FIG. 1, a perforated cylinder 25 is interposed between the one end cap 14 and the housing 11. The operative, axial length of the cylinder 25 is determined in relation to its purpose, which is to preclude the filter cartridge 12 from travelling within the housing 11 a distance sufficient to break the circumferential seal between the extension 16 and the socket 17. Factors to be considered in making this determination include the compressibility of the O-ring 23, the depth of the socket 17, the respective lengths of the two portions 20, 21 and the manufacturing tolerances of the various elements. Considering this latter point further, because relatively loose tolerances can be accomodated by permitting axial movement of the filter cartridge relative to the housing, the subject invention is particularly suited to the manufacture of filter assemblies intended for disposal in their entirety once the filter element is spent. It will be understood, however, that while axial movement of the filter cartridge relative to the housing is to be tolerated, it need not necessarily be promoted. Hence, the restraint may be sized in accordance with the foregoing criteria to restrict the axial movement of the filter cartridge to a minimum while avoiding the possibility that the restraint 25 will interfere with the assembly of the filter housing 11. As shown in the drawing, the cylinder 25 is preferably placed interior to the spring 18 and may be held in position by a bushing 26 formed in the end of the housing 11.

Figure 2:
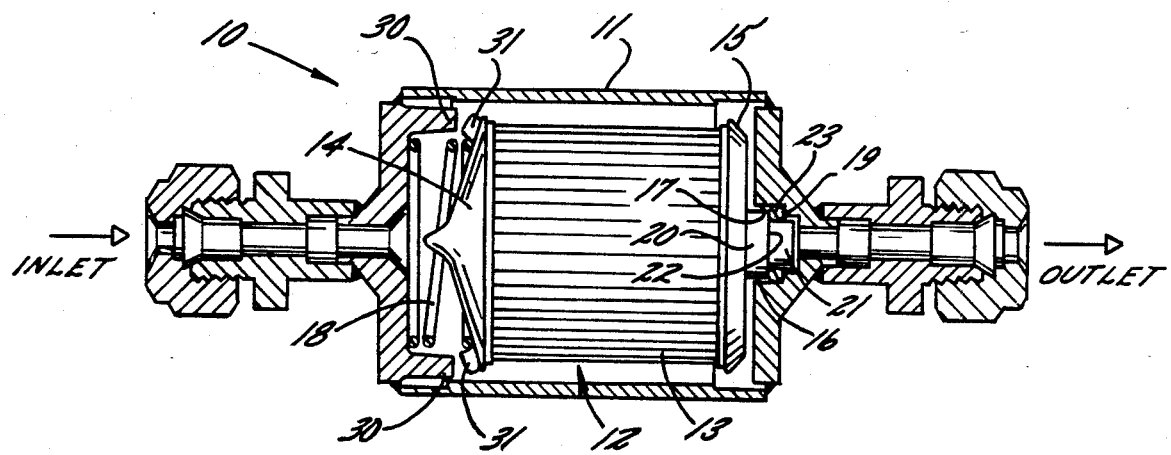

As will be noted in the alternate embodiment of FIG. 2, where similar parts are shown with the same reference numerals, other means may be employed to restrain the axial movement of the filter cartridge 12 relative to the housing 11. As shown in the Figure, an annular collar 30 circumscribing the interior of the housing may be used to contact the adjacent end cap 14 and thereby preclude the filter cartridge 12 from travelling a distance sufficient to break the circumferential seal between the extension 16 and the socket 17. In this alternate configuration, the one end cap 14 may include a ridge or a series of protruding supports 31 for contacting the annular collar 30. The protruding supports 31 may also serve to maintain the spring 18 in proper alignment.

In a typical operating sequence, fluid passes through the inlet and into the tubular filter 13 between the turns of the spring 18. The pressure drop created across the filter coupled with the force of the fluid flowing through the inlet passageway and abutting the closed end 14 of the filter cartridge 12 augment the axial force generated by the spring to urge the filter cartridge against the Teflon O-ring 23. Thus, the higher these forces, the more leak-tight is the axial sealing condition between the filter cartridge 12 and the housing 11, thereby eliminating the possibility of any fluid bypassing the filter element. The O-ring also provides a circumferential sealing condition between the filter cartridge and the housing, and this arrangement, in combination with the axial sealing condition, provides a very efficient, high pressure filter structure. In the event the flow of fluid through the filter is reversed, the fluid related forces will oppose the spring force and if they are greater than the axial force generated by the spring 18, the filter cartridge will move axially within the housing. This movement is restrained, however, by the perforated cylinder shown in FIG. 1, or the annular collar shown in FIG. 2, and at least the circumferential sealing condition between the extension and the housing will remain intact. Once the forces overcoming the spring are removed and the normal flow of fluid is restored, the filter cartridge will return to its original position within the housing with both axial and circumferential sealing at the O-ring.

The structure of this invention may be made of welded stainless steel or plastic, while the tubular filter may be made of sintered metal, wire mesh, ceramic, or conventional porous plastic construction. Also, absorption type filter elements may be used instead of surface type.

While this invention has been described in terms of a filter cartridge having a nipple-like extension being telescopically received by a mating socket and housing, one skilled in the art will appreciate that the extension may be affixed to the housing and that the mating socket may be formed in the end cap of the filter cartridge without departing from the spirit of the present invention. One skilled in the art will also understand that the fluid filter of this invention is adaptable to many filtration applications and may be used to filter either gasses or liquids.

I claim as my invention:

1. In a fluid filter having a housing with means defining an inlet and means defining an outlet, the combination comprising a filter cartridge disposed in the housing and comprising a generally tubular filter confined between end caps at each end thereof, one end cap being closed and the other end cap having a nipple-like extension with an opening therethrough communicating the interior of the tubular filter with the outlet, the extension being telescopically received by a generally mating socket, means for establishing both an axial and circumferential sealing condition between the extension and the mating socket, with at least the circumferential sealing condition being maintained over a limited range of travel of the filter cartridge relative to the housing, said sealing means including a gasket mounted about the extension within the socket and urged into axial and circumferential sealing condition, means for urging the extension into the axial sealing condition with the socket, and means for restraining the axial movement on the filter cartridge to prevent loss of the circumferential sealing condition between the extension and the socket in the event the flow of fluid through the filter is reversed.

2. The combination as claimed in claim 1 wherein the gasket comprises an O-ring.

3. The combination as claimed in claim 2 wherein the O-ring is formed of a plastic material.

4. The combination as claimed in claim 3 wherein the plastic material is Teflon.

5. The combination as claimed in claim 2 wherein the O-ring is formed of an elastomeric material.

6. The combination as claimed in claim 5 wherein the elastomeric material has an inert coating.

7. The combination as claimed in claim 2 wherein the means for urging the extension toward an axially sealed position comprises a spring interposed between the one end cap and the housing.

8. The combination as claimed in claim 7 wherein the spring is axially abutting the one end cap and the external surface of the extension has means for transmitting the axial sealing force generated by the spring to the O-ring.

9. The combination as claimed in claim 8 wherein the one end cap has at least one supporting ridge for maintaining the spring in proper alignment.

10. The combination as claimed in claim 1 wherein the means for restraining the axial movement of the filter cartridge is interposed between the one end cap and the housing.

11. The combination as claimed in claim 10 wherein the means for restraining the axial movement of the filter cartridge comprises a perforated cylinder which precludes the filter cartridge from travelling a distance sufficient to break the circumferential sealing condition between the extension and the socket.

12. The combination as claimed in claim 8 wherein the means for restraining the axial movement of the filter cartridge comprises a perforated cylinder located interior to the spring and which precludes the filter cartridge from travelling a distance sufficient to break the circumferential sealing condition between the extension and the socket.

13. The combination as claimed in claim 1 wherein the means for restraining the axial movement of the filter cartridge comprises at least one annular collar circumscribing the interior of the housing for contacting the adjacent end cap and which precludes the filter cartridge from travelling a distance sufficient to break the circumferential sealing condition between the extension and the socket.

14. The combination as claimed in claim 13 wherein the one end cap has at least one protruding support for contacting the annular collar.

15. The combination as claimed in claim 14 wherein the means for urging the extension into the axial sealing condition comprises a spring interposed between the one end cap and the housing and the support for contacting the annular collar maintains the spring in proper alignment.

16. The combination as claimed in claim 1 wherein the socket includes a shoulder and wherein the gasket is urged into an axial sealing condition between the extension and the shoulder and into circumferential sealing condition between the extension and the socket.

17. The combination as claimed in claim 16 wherein the extension includes a first portion and a flange at one end of the first portion and wherein the gasket is mounted about the first portion and urged into an axial sealing condition between the flange and shoulder and into circumferential sealing condition between the first portion and the socket.

18. The combination as claimed in claim 17 wherein the first portion of the extension and the socket each have circular cross sections.

* * * * *